Dec. 1, 1959  G. H. M. DAHL  2,914,884
TROLLING DEVICE
Filed Oct. 3, 1957
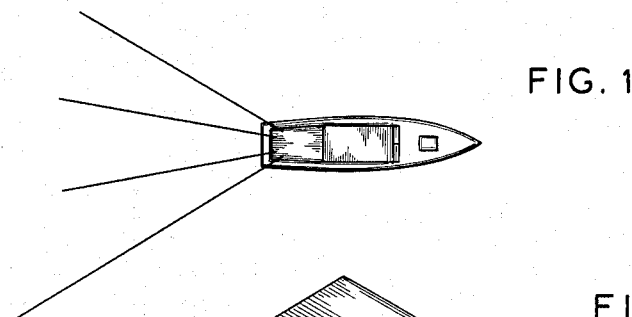
FIG. 1
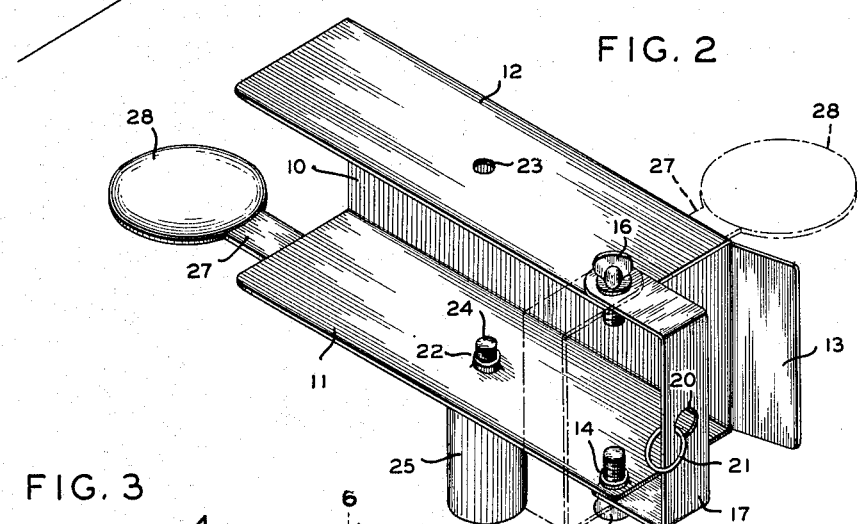
FIG. 2
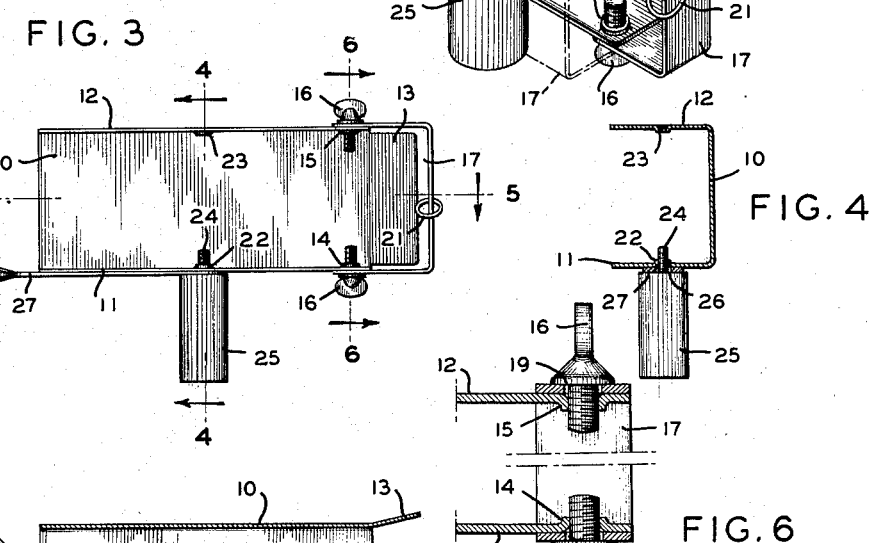
FIG. 3
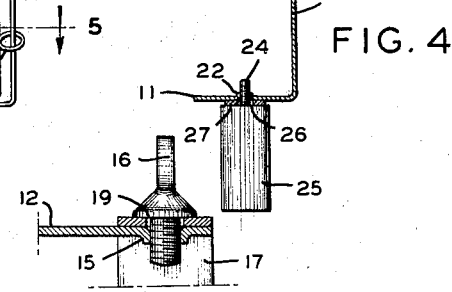
FIG. 4
FIG. 6
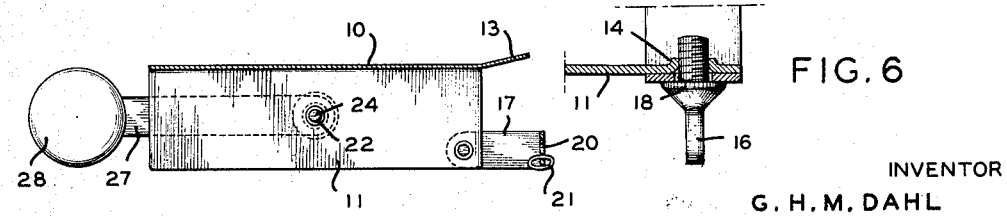
FIG. 5
INVENTOR
G. H. M. DAHL
BY *A. Yates Dowell*
ATTORNEY

United States Patent Office 2,914,884
Patented Dec. 1, 1959

2,914,884

TROLLING DEVICE

George H. M. Dahl, Washington, D.C.

Application October 3, 1957, Serial No. 687,916

5 Claims. (Cl. 43—43.13)

This invention relates to the pursuit of wildlife in the fresh and salt waters of the land, including fishing from a moving boat referred to as trolling, as well as to the equipment employed in an effort to obtain the most satisfactory results.

The invention is concerned particularly and specifically with equipment used in fishing from a moving boat or trolling, and to the maintenance of the hook at the desired depth and angular location with regard to the boat from which the fishing is done in order to maintain the hook in the best position to catch fish.

In trolling there has been little control of the depth and direction of movement of the hook, other than the direct following of the propelling force except as influenced by the use of weights and by the speed of the towing craft. It has been necessary to space lines substantially apart in order to keep them from tangling and traveling in a straight line, and frequently lines have become tangled especially on rounding curves. Also equipment has been expensive, unreliable, unwieldly, and difficult to use.

It is the object of the invention to overcome the difficulties mentioned and to provide simple and inexpensive trolling gear which is relatively small, of light weight, capable of being adjusted to various depths and positions in the water without adding or removing weights and with such adjustment substantially without effort.

Another object of the invention is to provide trolling gear of a character maintaining multiple lines, spaced apart so that they will not become entangled traveling in a straight line or around a curve, as well as trolling gear requiring minimum attention in use.

Other objects and advantages of the invention will be apparent from the following description taken in conjunction with the accompanying drawing herein:

Fig. 1 is a view from above illustrating a device for maintaining lines in spaced relation during trolling;

Fig. 2, a perspective of the trolling unit itself;

Fig. 3, a side elevation;

Fig. 4, a transverse section on the line 4—4 of Fig. 3;

Fig. 5, a longitudinal section on the line 5—5 of Fig. 3; and

Fig. 6 a transverse section on the line 6—6 of Fig. 3.

Briefly stated, the invention comprises a trolling device capable of being attached to the outer end portion of a fishing line and set to maintain a hook attached to the line at the proper depth in the water and to travel at an angle to the direction of the pulling force. The device is in the general form of a section of a channel of extremely light material, such as thin light sheet metal with an angular portion to influence the line of travel of the device and with a pulling yoke across one end.

With continued reference to the drawing, the trolling device of the present invention comprises a channel member, having a center portion 10 and a pair of side portions 11 and 12. At one end the center portion 10 is provided with an angular extension 13, designed to cause the device to travel at an angle instead of in a straight line.

The side members 11 and 12 are provided with threaded openings 14 and 15 adjacent one end for the reception of locking means, such as wing screws 16 on which are pivoted the ends of a yoke 17, having openings 18 and 19 disposed in alignment with the openings 14 and 15 and in which openings the wing screws are disposed. The wing screws engage and clamp the ends of the yoke in fixed position against the sides of the device. The yoke is provided at its center with an opening 20, for a ring 21, or other connection to a fishing line.

The sides of the U-shaped member are provided with central threaded openings 22 and 23, for the reception of a threaded stud 24, attached to a weight or ballast 25 of elongated cylindrical or other configuration. This weight with attached threaded stud is applicable to either side of the body of the device and likewise is adapted to extend through an opening 26, in one end of an arm-forming strip 27, having a weight 28, on its remote end, such arm and weight constituting a depth control device. In order to vary the depth of the device in water the arm can be swung about its mounting and clamped in adjusted position by the threaded stud.

In the use of the device the unit is attached to a fishing line near the hook by the connecting ring 21. The yoke and the depth control arm are set at the desired angle so that pulling force on the connection 21 causes the device to travel at a particular depth in the water and at a particular angle relative to the pulling force, so that it is possible to place several lines in the water without them becoming tangled, and which will remain in space relation even when rounding a curve. The weight 28 and depth control arm can be disposed on either side of the device in accordance with the side of the longitudinal center line on which the device is to be used.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A trolling device for controlling the relative position of a fishing line with regard to the pulling force and including a channel member having a center portion and opposed side portions, said center portion being of slightly greater width than the width of the side portions and having an extension at one end disposed at an angle to the remainder of such center portion, an adjustable yoke connected to the side portions adjacent the extension at end of the channel member but near the outer edges of the side members, wing screws for fastening said yoke in any desired adjusted position, a weighted body selectively disposed outwardly from one side of said channel member for maintaining such side downwardly in water and an arm having one end pivoted adjacent to the connection between said weight and said channel member and having a weight on its opposite end, said arm being rotatable about its connection to said channel member for adjusting the depth of the device in water.

2. A trolling device for controlling the depth and lateral position of a fish hook attached to a fishing line with regard to a boat, said device including a channel member having a center portion and opposed side portions, said center portion having an extension at one end disposed at an angle to the remainder of such portion, an adjustable yoke connected to said side portions adjacent to said extension, means for fastening said yoke in any desired angularly adjusted position, a weighted body disposed outwardly from one of said side portions for maintaining such side portion downwardly while said device is located at one side of said boat, means for fastening said weighted body to the other of said side portions for maintaining said device at the other side of said boat.

3. The structure of claim 2, having a weighted arm adjustably attached to said side portion to control the depth of said device.

4. A trolling device for attachment to a fishing line to maintain the same at a predetermined constant depth and lateral position in the water comprising a channel member of relatively thin material, an adjustable yoke attached to said channel member, means for fastening said yoke in adjusted position to cause said device to maintain a constant lateral position, an adjustable weighted arm mounted at one side on said channel member, and means for fastening said arm in adjusted position to cause said device to maintain a constant depth in the water.

5. A trolling device comprising an elongated body of relatively thin metal of a construction such that when pulled in the water it will be influenced by the direction of the pull and by the distribution of the weight, an adjustable yoke attached to one end portion of said body, means for fastening said yoke in adjusted position to maintain said device at a constant lateral position, a weighted arm beneath and adjustably carried by said body, and means for fastening said arm in adjusted position to maintain said device at a constant depth.

References Cited in the file of this patent

UNITED STATES PATENTS

| | | |
|---|---|---|
| 780,029 | Flegle | Jan. 17, 1905 |
| 1,897,109 | Bobo | Feb. 14, 1933 |
| 2,247,583 | Louthan | July 1, 1941 |
| 2,255,465 | Hickey | Sept. 9, 1941 |
| 2,556,423 | Gross | June 12, 1951 |
| 2,744,352 | Holgerson | May 8, 1956 |